United States Patent
Seo et al.

(10) Patent No.: US 10,891,424 B2
(45) Date of Patent: Jan. 12, 2021

(54) SYSTEM AND METHOD FOR GENERATING 3D IMAGE CONTENT WHICH ENABLES USER INTERACTION

(71) Applicant: Korea Institute of Science and Technology, Seoul (KR)

(72) Inventors: Dae Il Seo, Seoul (KR); Byoung Hyun Yoo, Seoul (KR); Hee Dong Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 13 days.

(21) Appl. No.: 15/489,077

(22) Filed: Apr. 17, 2017

(65) Prior Publication Data
US 2018/0027223 A1    Jan. 25, 2018

(30) Foreign Application Priority Data
Jul. 22, 2016 (KR) .......................... 10-2016-0093327

(51) Int. Cl.
| | | |
|---|---|---|
| *G06F 40/14* | (2020.01) | |
| *H04N 13/178* | (2018.01) | |
| *H04N 13/194* | (2018.01) | |

(52) U.S. Cl.
CPC ........... *G06F 40/14* (2020.01); *H04N 13/178* (2018.05); *H04N 13/194* (2018.05)

(58) Field of Classification Search
None
See application file for complete search history.

(56) References Cited

U.S. PATENT DOCUMENTS

| | | | | |
|---|---|---|---|---|
| 2003/0225696 A1* | 12/2003 | Niwa | ................. | H04N 21/4753 705/50 |
| 2009/0052164 A1* | 2/2009 | Kashiwagi | ........... | G09G 3/3413 362/97.2 |
| 2011/0018966 A1* | 1/2011 | Kitazato | ............. | H04N 13/194 348/43 |
| 2011/0128351 A1* | 6/2011 | Newton | ................. | H04N 5/278 348/43 |

(Continued)

FOREIGN PATENT DOCUMENTS

| | | | |
|---|---|---|---|
| KR | 10-2014-0146486 A | | 12/2014 |
| KR | 20140146486 A | * | 12/2014 |

(Continued)

OTHER PUBLICATIONS

Seo, D. et al., "Webized 3D Experience by HTML5 Annotation in 3D Web", Proceedings of the 20th International Conference on 3D Web Technology, Jun. 18-21, 2015, Heraklion, Crete, Greece, pp. 73-80 (Jun. 2015) (Year: 2015).*

(Continued)

*Primary Examiner* — Lindsay J Uhl
(74) *Attorney, Agent, or Firm* — NSIP Law (57) ABSTRACT

Provided is a three dimensional (3D) image content generating system. The 3D image content generating system includes a display profiler configured to receive profile information including a hardware characteristic of a display device from the display device, and a content generator configured to receive at least one of a first type of content having no 3D information and a second type of content having 3D information, and to generate an image according to the profile information.

15 Claims, 7 Drawing Sheets

(56) References Cited

U.S. PATENT DOCUMENTS

| | | | | |
|---|---|---|---|---|
| 2012/0139909 A1* | 6/2012 | Choi | ............ | G02B 27/2264 |
| | | | | 345/419 |
| 2014/0168056 A1* | 6/2014 | Swaminathan | .... | G06K 9/00604 |
| | | | | 345/156 |
| 2014/0184730 A1* | 7/2014 | Liu | ............ | H04N 13/351 |
| | | | | 348/14.08 |
| 2016/0134900 A1* | 5/2016 | Wei | ............ | H04N 21/85406 |
| | | | | 725/32 |

FOREIGN PATENT DOCUMENTS

| | | |
|---|---|---|
| KR | 10-2015-0108149 A | 9/2015 |
| KR | 10-2016-0062671 A | 6/2016 |

OTHER PUBLICATIONS

Seo, D. et al., "Webized 3D Experience by HTML5 on in 3D Web", Proceedings of the 20th International Conference on 3D Web Technology, Jun. 18-21, 2015, Heraklion, Crete, Greece, pp. 73-80 (Jun. 2015) (Year: 2015).*

Seo, D., et al., "Webized 3D Experience by HTML5 Annotation in 3D Web," Proceedings of the 20th International Conference on 3D Web Technology held on Jun. 18-21, in Crete, GR (8 pages in English).

Korean Office Action dated Jul. 21, 2017 in counterpart Korean Patent Application No. 10-2016-0093327 (1 page in English and 5 pages in Korean).

\* cited by examiner

FIG. 9

SYSTEM AND METHOD FOR GENERATING 3D IMAGE CONTENT WHICH ENABLES USER INTERACTION

CROSS-REFERENCE TO RELATED APPLICATION

This application claims priority to and the benefit of Korean Patent Application No. 2016-0093327, filed on Jul. 22, 2016, the disclosure of which is incorporated herein by reference in its entirety.

BACKGROUND

1. Field of the Disclosure

The present invention relates to a system and method for generating three dimensional (3D) image content which enables user interaction and is capable of automatically generating and providing content which is applicable to a 3D image display, such as a super multiview image display.

2. Discussion of Related Art

With the development of wires/wireless wideband communication technology, there is an increasing demand for high quality realistic image content. Three dimensional (3D) TVs using binocular parallax were not widely used due to the inconvenience of wearing glasses and lack of content. A glassesless 3D display (an autostereoscopic display) has been suggested as an image implementation technology for addressing the limitation of a glasses 3D display (a stereoscopic 3D display). As a glassesless 3D stereographic image representation method, a multiview image technology capable of reproducing motion parallax has been actively developed for user convenience.

A multiview 3D display provides a 3D image having binocular parallax and motion parallax information to an observer in front of the display by arranging a finite number of 3D viewpoint images on a space by using Time-Multiplexing or Space-Multiplexing. Such a glassesless multiview 3D display may use a parallax barrier, a lenticular lens, or a linear light source to perform parallax separation.

An autostereoscopic multiview 3D display among current mainstream commercial 3D products is designed to have a distance between adjacent viewing zones larger than a size of a pupil of an observer. However, such a multiview 3D display may cause an observer fatigue in terms of human factors. A research result has been found showing that fatigue may be reduced by designing a distance between adjacent viewing zones to be smaller than the size of the pupil of an observer so that a point of accommodation of one eye coincides with a point of convergence of both eyes. A display adopting this concept is referred to as a super multiview 3D display. In particular, a multiview 3D display having a distance between adjacent viewing zones equal to or smaller than the size of the pupil of an observer is referred to as a high density multiview 3D (HD-MV3D) display.

Accordingly, the use of autostereoscopic multiview 3D displays and super multiview 3D displays has recently increased, which has brought about a need for methods of supplying content that can be used in these display devices.

A rendering method of a super multiview image for super multiview displays varies according to corresponding resolutions, numbers of views, viewing zone, and multiplexing methods. Therefore, the current technology reconstructs super multiview image content into a 3D scene according to the type and scheme thereof and detailed settings of a super multiview image display, and then generates exclusive content for each super multiview image display. As such, there is a difficulty in supplying super multiview content and inconvenience of a user having to use super multiview content corresponding to a detailed specification of a super multiview display.

Also, because images from different views are individually generated and are combined as a single multiplexed image according to a resolution, the number of views, and a method of multiplexing viewing zones of a super multiview display according to the existing method of generating a super multiview display image, an image seen through a lens or a barrier may not be properly projected when the image is not 3D image content specifically calculated to be usable in the specific super multiview display. Accordingly, a general image and an output signal of a computer that are used in a general computing environment, rather than a super multiview display, are output as normal images before passing through a lens or a barrier of a super multiview image display, but are seen as an image undistinguishable to eyes of a user while passing through an optical device, such as a lens or a barrier.

That is, existing technologies concerning super multiview image display are mainly focused on improving the completeness of hardware which is configured to increase views, vary a distance to a user, or provide content depending on a change in a user's motion, thus having a limitation in that the experience of a user who consumes the content is not considered.

RELATED ART DOCUMENT

Patent Document (Patent Document 1) Korean Laid-Open Patent Publication NO. 10-2016-0062671
(Patent Document 2) Korean Laid-Open Patent Publication NO. 10-2015-0108149

SUMMARY OF THE DISCLOSURE

The present invention is directed to a technology for a system and method for generating three dimensional (3D) image content enabling Internet, video, and IP-based service content, which are the majority of digital image content, to be used together with 3D display exclusive content in an autostereoscopic 3D display device.

The present invention is directed to a technology for a system and method for generating 3D image content enabling a 3D display device to easily provide not only specifically manufactured 3D display exclusive content but also a widely used general computer image.

To achieve the above-described objectives, according to a first aspect of the present invention, there is provided a three dimensional (3D) image content generating system, the system including a display profiler and a content generator. The display profiler may be configured to receive profile information including a hardware characteristic of a display device from the display device. The content generator may be configured to receive at least one of a first type of content having no 3D information and a second type of content having 3D information from a content provider, and to generate an image according to the profile information.

The 3D image content generating system may further include a user interaction handler configured to perform a user interaction with respect to the first type of content.

The content generator may include: a content loader configured to receive content according to a format of the first type of content and the second type of content; and a content renderer configured to generate 3D image content from the first type of content and the second type of content.

The content renderer of the content generator may include a 3D content renderer configured to blend and render the first type of content and the second type of content, wherein the 3D content renderer may include a 3D blender configured to construct a first scene graph for the first type of content and a second scene graph for the second type of content according to a type of content received through the content loader, and to integrated the first scene graph and the second scene graph into a scene graph on the same 3D space.

The content render of the content generator may further include a stereographic content renderer configured to generate 3D image content from the integrated scene graph, wherein the stereographic content renderer may include: a stereographic image renderer configured to generate an image for each viewing zone from scene information in which the first type of content is blended with the second type of content according to the integrated scene graph; and a multiplexer configured to generate a 3D image by multiplexing the images for each viewing zones.

The first type of content may include a Hyper Text Markup Language (HTML) document.

To achieve the above-described objectives, according to a second aspect of the present invention, there is a method for generating a three dimensional (3D) image content, which includes steps of: (a) receiving profile information including a hardware characteristic of a display device from the display device; (b) receiving at least one of a first type of content having no 3D information and a second type of content having 3D information; and (c) generating an image by using at least one of the first type of content and the second type of content according to the profile information.

The above step of (c) may include generating a 3D image when the profile information indicates a 3D display, and providing a rendered image when the profile information indicates a general display.

The above step of (c) may include constructing a first scene graph for the first type of content and a second scene graph for the second type of content when both the first type of content and the second type of content are provided in (b), and integrating the first scene graph and the second scene graph into a scene graph on the same 3D space.

The above step of (c) may include generating an image for each viewing zone from scene information in which the first type of content is blended with the second type of content according to the integrated scene graph.

The above step of (c) may include rendering images for n-view points from the integrated scene graph.

The above step of (c) may include generating a 3D image by multiplexing the images for the respective viewing zones.

The method may further include providing the display device with the generated 3D image.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above and other advantages and a scheme for the advantages of the present invention will become readily apparent when considered in conjunction with the accompanying drawings with reference to the following detailed description. However, the scope of the present invention is not limited to such embodiments and the present invention may be realized in various forms. The embodiments which will be described below are only provided to bring the disclosure of the present invention to completion and assist those skilled in the art in completely understanding the present invention. The present invention is defined only by the scope of the appended claims. In addition, the same reference numerals are used to designate the same elements throughout the drawings. The term "and/or" includes any and all combinations of one or more of the associated listed items.

It should be understood that although the terms first, second, third, etc. may be used herein to describe various elements, components, regions, layers, and/or sections, these elements, components, regions, layers, and/or sections are not limited by these terms. These terms are used to only distinguish one element, component, region, layer, or section from another region, layer, or section. Thus, a first element, component, region, layer or section discussed below could be termed a second element, component, region, layer, or section without departing from the teachings of the present inventive concept.

It should be noted that identification codes of respective operations (e.g. a, b, and c) are used for the sake of convenience in description rather than to indicate the order of the operations, and an operation may occur out of an order noted in the specification unless the order is otherwise defined. For example, each operation may occur in the order noted in the specification, may actually be executed concurrently, or may be executed in a substantially reversed order.

The terminology used herein is for the purpose of describing particular embodiments only and is not intended to be limiting of the present inventive concept. As used herein, the singular forms "a," "an," and "the" are intended to include the plural forms as well unless clearly indicated otherwise by context. It should be further understood that the terms "comprises" and/or "comprising," specify the presence of stated features, integers, steps, operations, elements, and/or components when used in this specification, but do not preclude the presence or addition of one or more other features, integers, steps, operations, elements, components, and/or groups thereof.

All terms (including technical and scientific terms) used herein have the same meanings as commonly understood by one of ordinary skill in the art to which this inventive concept belongs unless defined otherwise. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

In the description of the embodiments, the detailed description of related known functions or constructions will be omitted herein to avoid obscuring the subject matter of the present invention. In addition, terms which will be described below are defined in consideration of functions in the embodiments of the present invention, and may vary with an intention of a user and an operator or a custom. Accordingly, the definition of the terms should be determined based on the overall content of the specification.

Figure 1:
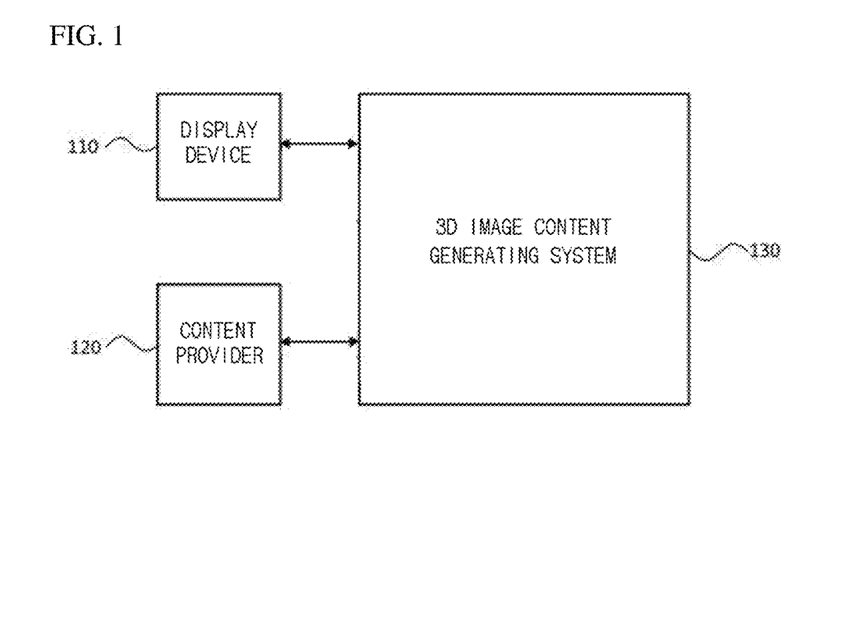
FIG. 1 is a block diagram illustrating a configuration of a three dimensional (3D) image content generating system according to a preferred embodiment of the present invention.

FIG. 1 is a block diagram illustrating a configuration of a three dimensional (3D) image content generating system according to a preferred embodiment of the present invention. FIGS. 2 to 6 are block diagrams illustrating details of the 3D image content generating system shown in FIG. 1. Hereinafter, the 3D image content generating system will be described with reference to FIGS. 1 to 6.

Referring to FIG. 1, a 3D image content generating system 130, such as a super multiview 3D image content generating system, is connected to a display device 110 and a content provider 120. The display device 110 provides the 3D image content generating system 130, such as a super multiview 3D image content generating system, with profile information including a hardware characteristic of the display device 110, and receives and displays an image generated in the 3D image content generating system 130, such as a super multiview 3D image content generating system. The display device 110 may correspond to a super multiview image exclusive display device, a multiview 3D display device, or a general display device.

The content provider 120 may provide the 3D image content generating system 130 with content to be displayed through the display device 110, and the content provider 120 may preferably store and manage content.

The 3D image content generating system 130 receives a profile from the display device 110, receives content from the content provider 120, and generates an image according to the profile. In addition, the 3D image content generating system 130 provides the display device 110 with the generated image so that the image is displayed on the display device 110. Preferably, the 3D image content generating system 130 may be implemented as a server connected to the display device 110 and the content provider 120 via a network.

Figure 2:
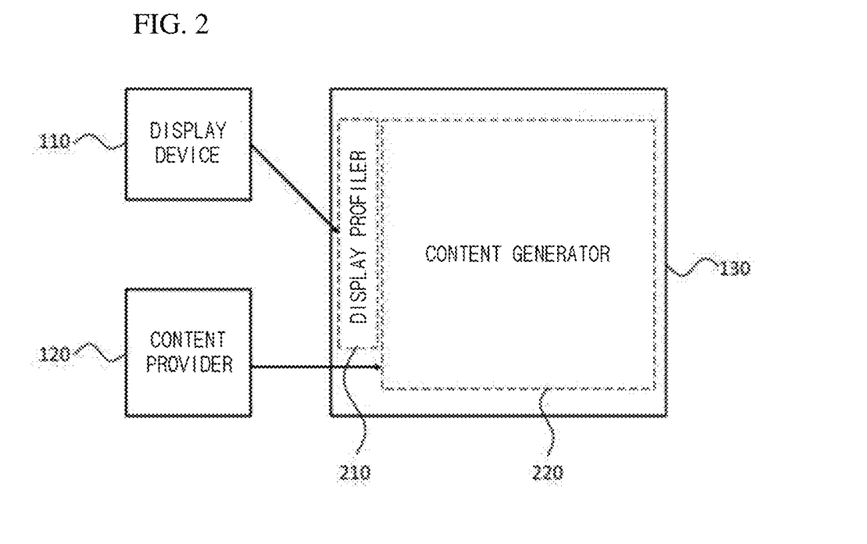
FIGS. 2 to 6 are block diagrams illustrating details of the 3D image content generating system shown in FIG. 1.

In more detail, referring to FIG. 2, the 3D image content generating system 130 may include a display profiler 210 and a content generator 220.

The display profiler 210 receives profile information including hardware characteristics of the display device 110 from the display device 110. That is, the display profiler 210 may receive information indicating whether the display device 110 corresponds to a super multiview 3D display device, a multiview 3D display device, or a general display device.

Figure 3:
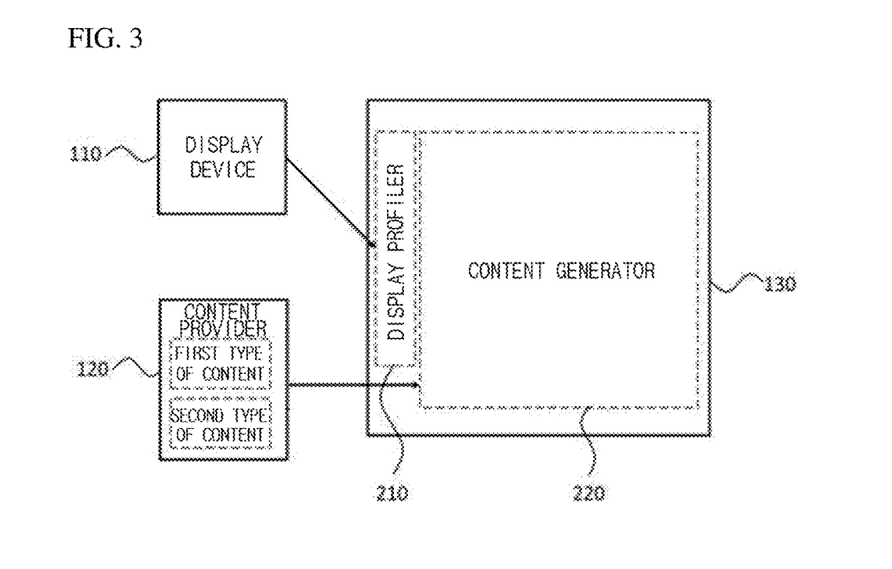

The content generator 220 generates an image according to the profile information by using the content provided from the content provider 120. The content provider 120 may include a first type of content and a second type of content as shown in FIG. 3, and the first type of content corresponds to general purpose universal content, for example, a digital image, a Hyper Text Markup Language (HTML) document, Internet content, a video, or an IP-based service image. Internet content may include web content that may enable user interaction, for example, portal site content or content in YouTube of Google. The second type of content may correspond to 3D image display exclusive content, such as super multiview 3D image display content. That is, the first type of content corresponds to content having no 3D information, and the second type of content corresponds to content having 3D information.

Preferably, the content generator 220 may receive at least one of the first type of content having no 3D information and the second type of content having 3D information, and generate an image according to profile information. For example, the content generator 220 may generate a super multiview image from the received content when the profile information indicates a super multiview 3D display device, and render the received content according to a general method and provides the display device 110 with the rendered content when the profile information indicates a general display device.

The following description will be under the assumption that the profile information indicates a super multiview 3D display device and relate to a detailed configuration of the content generator 220 generating super multiview image content that may enable user interaction based on content received from the content provider 120.

Figure 4:
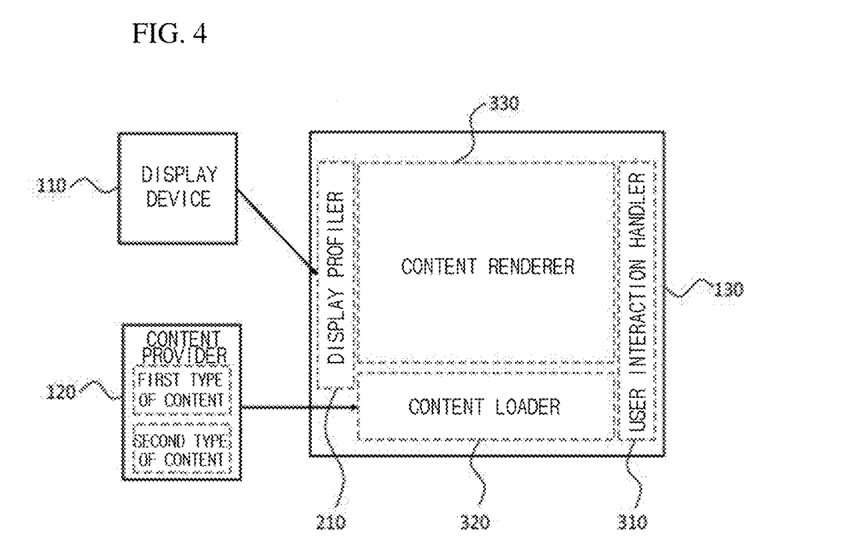

Referring to FIG. 4, according to an embodiment of the present invention, the 3D image content generating system 130 may further include a user interaction handler 310, and the content generator 220 of the 3D image content generating system 130 may include a content loader 320 and a content renderer 330.

The user interaction handler 310 performs user interaction with respect to the first type of content. Preferably, the user interaction handler 310 performs rendering including an interaction model of the first type of content, thereby performing a user interaction which exists in general purpose universal content is possible. For example, the user interaction may include all interaction models in which a user interacts with universal content by using a keyboard, a mouse, and other various input devices. In detail, the user interaction may include entering a key word by using a keyboard and outputting the entered result in a form of 2 dimensional text or images, or include all user interaction models of HTML5 supported by a standard web browser.

The content loader 320 receives content from the content provider 120 according to a format of the first type of content and the second type of content. That is, the content loader 320 may receive the first type of content, which is used for general purpose and has no 3D information, the second type of content, which has 3D information for generating super multiview image content, or content having both of the first type of content and the second type of content.

Figure 5:
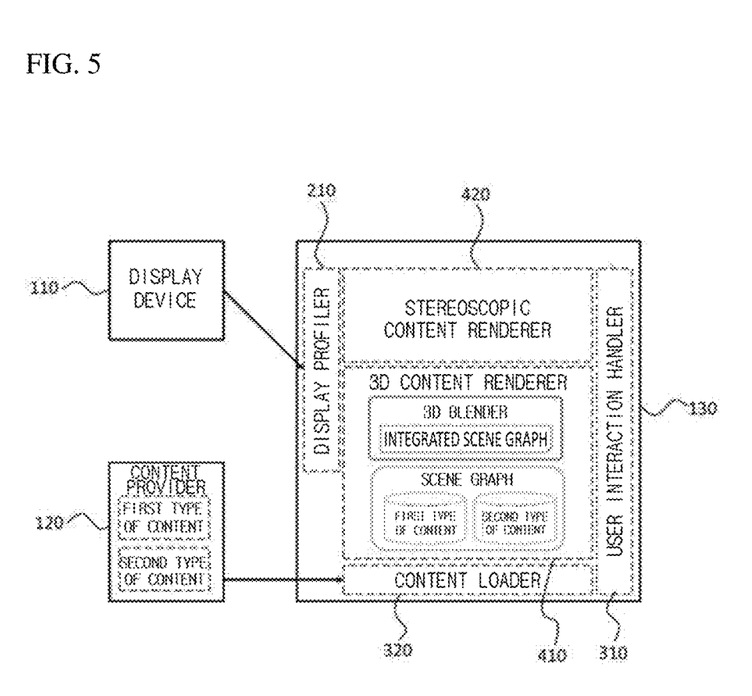

The content renderer 330 generates super multiview image content from the first type of content and the second type of content. Referring to FIG. 5, according to an embodiment of the present invention, the content renderer 330 includes a 3D content renderer 410 and a stereoscopic content renderer 420.

The 3D content renderer 410 blends and renders the first type of content and the second type of content. Preferably, the 3D content renderer 410 includes a 3D blender, and the 3D blender constructs a first scene graph for the first type of content and a second scene graph for the second type of content according to a type of content received through the content loader 320, and integrates the first scene graph and the second scene graph into a scene graph on the same 3D space. That is, the 3D blender allows different types of content to be integrated into the same scene graph on the same 3D space so that an integrated 3D scene graph is generated. Since the integrated 3D scene graph has the same characteristic as that of the second type of content which corresponds to content dedicated exclusively to a super multiview image display device, a super multiview image may be provided according to a general super multiview image content rendering method.

Figure 6:
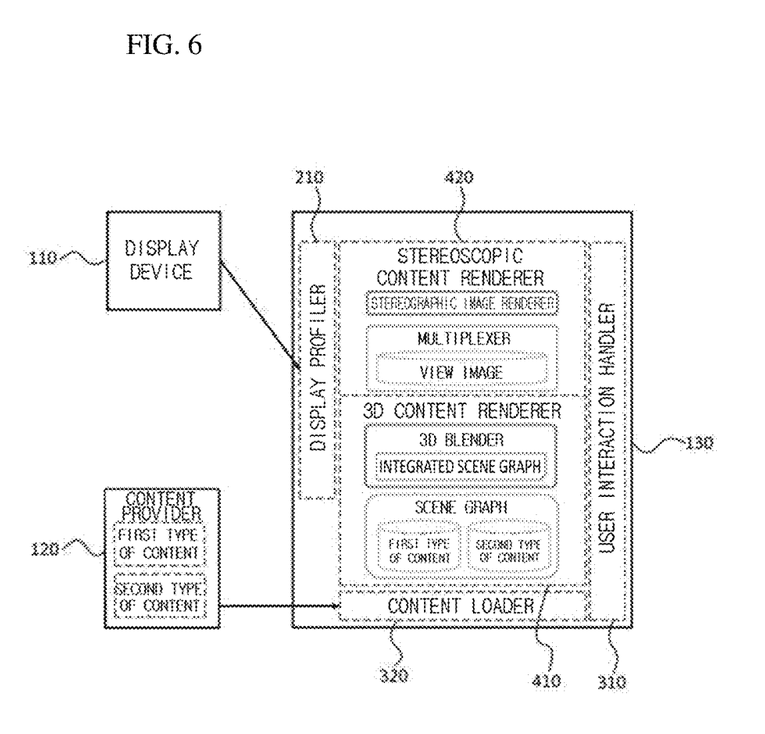

The stereoscopic content renderer 420 generates super multiview image content from the scene graph integrated by the 3D content renderer 410. Referring to FIG. 6, according to an embodiment of the present invention, the stereoscopic content renderer 420 may include a stereoscopic image renderer and a multiplexer. The stereoscopic image renderer generates an image for each viewing zone with integrated scene information in which the first type of content is blended with the second type of content according to the integrated scene graph, and the multiplexer generates a super multiview image by multiplexing the images of the respective viewing zones.

Figure 7:
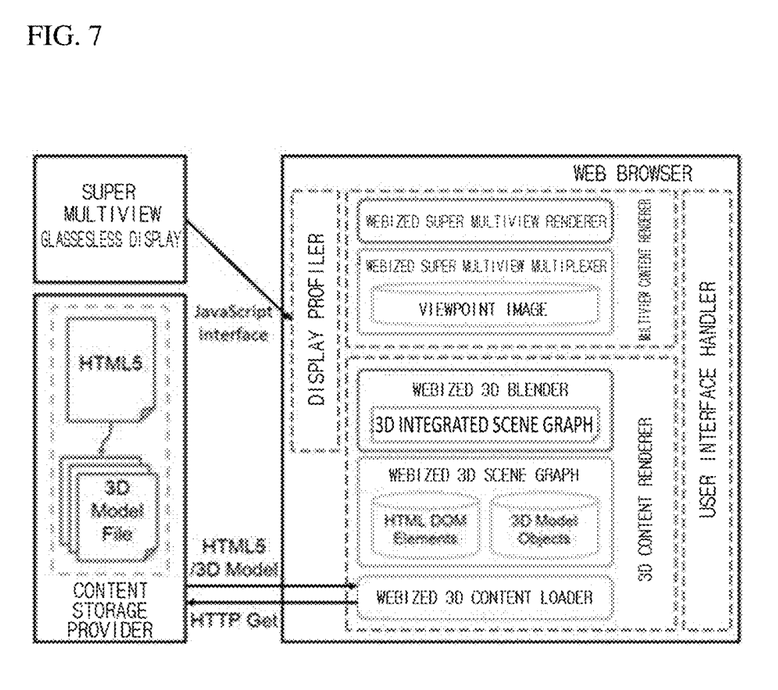
FIG. 7 is an exemplary diagram of the 3D image content generating system according to an embodiment of the present invention.

FIG. 7 is an exemplary diagram of the super multiview image content generating system according to an embodiment of the present invention.

Referring to FIG. 7, the display device 110 connected to a super multiview image content generating system is a super multiview (SMV) autostereoscopic display, the content provider 120 is a content store provider, the first type of content is an HTML5 document which is used as a standard on the internet, and the second type of content is a 3D model file.

That is, FIG. 7 illustrates a case in which super multiview image content is generated by using content having a combination of an HTML5 document and 3D content. First, a webized 3D content loader of the super multiview image content generating system recognizes the HTML5 document as the first type of content and the 3D model file as the second type of content, and loads the two types of content through an HTTP protocol. Then, the 3D content renderer performs rendering on a standard HTML document in the same manner as a standard web browser so that all interactions in a document object model (DOM) of the HTML document may be handled. In this case, a resultant image from the rendering for interaction is not displayed on the display device in practice. At the same time, a webized 3D blender arranges elements of the HTML5 document on a 3D space to generate a 3D scene graph so that a scene graph integrated with 3D content corresponding to the second type of content is generated. The integrated scene graph has the same 3D content attribute as that of the second type of content. A webized super multiview renderer and a webized super multiview multiplexer of a super multiview content renderer generate a super multiview image by using the integrated scene graph.

Figure 8:
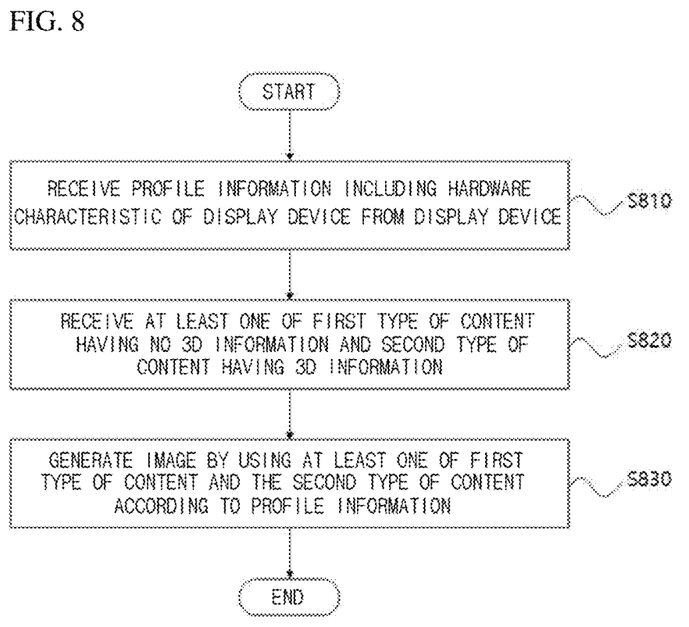
FIG. 8 is a flowchart showing a method for generating 3D image content according to an embodiment of the present invention.

FIG. 8 is a flowchart showing a method for generating 3D image content according to an embodiment of the present invention. Hereinafter, the method for generating 3D image content according to an embodiment of the present invention will be described with reference to FIGS. 8 and 9.

The display profiler 210 of the 3D image content generating system 130 receives profile information including a hardware characteristic of the display device 110 from the display device 110 (S810).

The content loader 320 of the 3D image content generating system 130 receives at least one of a first type of content having no 3D information and a second type of content having 3D information from the content provider 120 (S820).

The content renderer 330 of the 3D image content generating system 130 generates an image by using at least one of the first type of content and the second type of content according to the profile information (S830). Preferably, the content renderer 330 generates a super multiview image when the profile information indicates a super multiview display, and generates a rendered image when the profile information indicates a general display. That is, the profile information is applied to a process of generating super multiview image content by using the first type of content and the second type of content so that the super multiview image content may be automatically generated according to physical characteristics of the display device 110.

Preferably, when the content loader 320 receives the first type of content corresponding to two dimensional (2D) content and the second type of content corresponding to 3D content, the 3D content renderer 410 of the content renderer 330 arranges the 2D content, that is, the first type of content, on a 3D space, and integrates the first type of content with the 3D content, that is, the second type of content, on the 3D space. In other words, the 3D content renderer 410 performs mixed rendering of arranging the first type of content and the second type of content on the same 3D space in FIG. 9. In this case, the first type of content may correspond to an HTML document. In more detail, when the first type of content is an HTML element, the 3D content renderer 410 may render the first type of content through a standard HTML rendering pipeline, and handle all interaction models of the HTML element according to an implementation of standard HTML specifications. For example, the implementation of the standard HTML specification may represent a web browser.

The first type of content and the second type of content integrated on the 3D space are provided to the stereoscopic content renderer 420, and are generated as a super multiview image through a stereographic image renderer and a multiplexer in the same way that the second type of content is generated as a super multiview image. That is, when the first type of content is an HTML element, scene information in which the first type of content is blended with the second type of content, which are integrated by being arranged on the 3D space, is generated as images for each views through texture rendering process shown in FIG. 9, and is completed as a super multiview image through a multiplexing process shown in FIG. 9. In more detail, a texture rendering process is that the stereographic image renderer performs rendering on images for n-views from a 3D scene graph in which the first type of content and the second type of content are integrated, and a multiplexing process is that the multiplexer multiplexes the images for n-views generated through the texture rendering.

Figure 9:
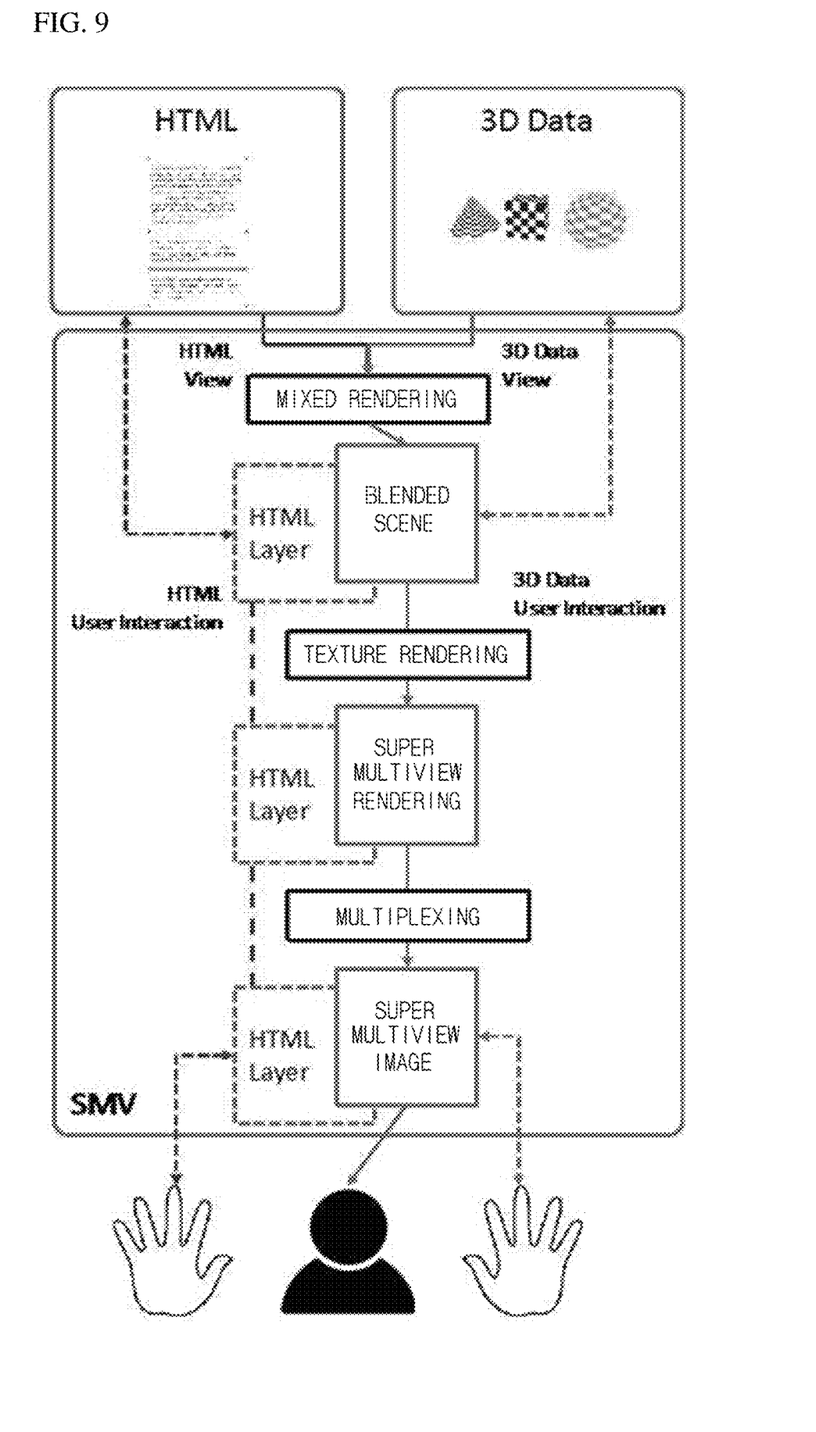
FIG. 9 is an exemplary diagram of the method for generating 3D image content according to an embodiment of the present invention

As for user interaction, a user interaction of the first type of content exchanges information with an HTML element which is rendered through an HTML rendering pipeline of an HTML layer shown in FIG. 9. The first and second types of content integrated in a mixed rendering processor only share a 3D space, a result of the first type of content being rendered in the HTML layer is not visualized on the super multiview image. That is, an image of the first type of content is visualized by being multiplexed into the super multiview image through the scene graph integrated with the second type of content in the mixed rendering process. In addition, an interaction model of the second type of content may be handled according to the interaction model of the second type of content or handled according to an interaction model of the first type of content. A method of handling the interaction model of the second type of content may be selected by a user. Accordingly, the super multiview image having a blend of the first type of content and the second type which enables user interaction of the first type of content is provided.

Accordingly, the method for generating 3D image content according to the present invention may be effectively applied to a 3D image content providing system which is connected to an Internet service, or an Internet portal service for providing 3D content; may provide a user with both general universal content and super multiview image content at the same time by providing 3D image content, such as super multiview image content, in a social network service; and may improve effectiveness thereof by being applied to services in which user interactions frequently occur.

As should be apparent from the above, a 3D display device, in particular, a super multiview display, can provide image content manufactured for an existing general display and content including a user interaction.

In addition, general image content and 3D image content can be automatically provided as a general image and a 3D image, such as a super multiview image, according to a physical characteristic of a display device used by a user.

In addition, general image content, super multiview exclusive image content, and content in a form of a combination of the general image content and the super multiview image content can be provided to a user of a 3D image display device, such as a super multiview 3D display device, without changing the display device.

In addition, a large amount of existing contents that are generated without considering 3D image display rendering methods can be viewed on a 3D image display device, such as a super multiview 3D display device, while maintaining a unique user interaction model included in a general universal image content.

Meanwhile, the method for generating 3D image content according to an embodiment can also be embodied as computer readable codes on a computer readable recording medium. A computer readable recording medium is any data storage device that can store data which can be thereafter read by a computer system.

Examples of the computer readable recording medium include read-only memory (ROM), random-access memory (RAM), compact disc (CD)-ROMs, magnetic tapes, hard disks, floppy disks, portable storage devices, non-volatile memory (Flash Memory), and optical data storage devices.

Also, the computer readable recording medium can also be distributed over network coupled computer systems so that the computer readable code is stored and executed in a distributed fashion.

Although a preferred embodiment of the 3D image content generating system and method has been described, it should be understood that the foregoing is not to be construed as limited to the specific embodiments disclosed, and that modifications to the disclosed embodiments, as well as to other embodiments, are intended to be included within the scope of the appended claims, the specification, and the accompanying drawings.

What is claimed is:

1. A system for generating three-dimensional (3D) image content, comprising:
   a processor configured to
   receive, from a display device, profile information including a hardware characteristic of the display device,
   receive, from a content provider, a first type of content having no 3D information and a second type of content having 3D information exclusively for rendering on a stereoscopic 3D display; and
   generate an image by integrating the first type of content and the second type of content into a common 3D space, based on the profile information,
   wherein the generated image is either one or both of a general image and a 3D image,
   wherein the profile information further comprises a super multiview 3D display device or a general display device, and
   wherein the generation of the image is the generation of a super multiview image upon the profile information being the super multiview 3D display device, and a rendered image upon the profile information being the general display device.

2. The system of claim 1, wherein the processor comprises
   a display profiler configured to receive, from the display device, the profile information including the hardware characteristic of the display device,
   a content generator configured to receive, from the content provider, the first type of content and the second type of content, and to generate the image by integrating the first type of content and the second type of content into the common 3D space, based on the profile information, and
   a user interaction handler configured to interact with a user with respect to the first type of content.

3. The system of claim 2, wherein the content generator comprises
   a content loader configured to receive content according to a format of the first type of content and the second type of content, and
   a content renderer configured to generate the 3D image content from the first type of content and the second type of content.

4. The system of claim 3, wherein
   the content renderer comprises a 3D content renderer configured to blend and render the first type of content and the second type of content, and
   the 3D content renderer comprises a 3D blender configured to construct a first scene graph for the first type of content and a second scene graph for the second type of content according to a type of content received through the content loader, and to integrate the first scene graph and the second scene graph into an integrated scene graph on the common 3D space.

5. The system of claim 4, further comprising a multiplexer configured to generate the 3D image by multiplexing images for each viewing zone, wherein
   the content renderer further comprises a stereographic content renderer configured to generate 3D image content from the integrated scene graph, and
   the stereographic content renderer comprises a stereographic image renderer configured to generate an image for each viewing zone from scene information in which the first type of content is blended with the second type of content according to the integrated scene graph.

6. The system of claim 2, wherein the first type of content includes a Hyper Text Markup Language (HTML) document.

7. A method for generating three-dimensional (3D) image content, comprising:

receiving, from a display device, profile information including a hardware characteristic of the display device;

receiving, from a content provider, a first type of content having no 3D information and a second type of content having 3D information exclusively for rendering on a stereoscopic 3D display; and generating an image by integrating the first type of content and the second type of content into a common 3D space, based on the profile information, wherein the generated image is either one or both of a general image and a 3D image, wherein the profile information further comprises a 3D display device or a general display device, and wherein the generation of the image is the generation of a super multiview image upon the profile information being the super multiview 3D display device, and a rendered image upon the profile information being the general display device.

8. The method of claim 7, wherein the generating of the image comprises generating the 3D image for the 3D display, in response to the profile information indicating the 3D display.

9. The method of claim 7, wherein the generating of the image comprises constructing a first scene graph for the first type of content and a second scene graph for the second type of content when both the first type of content and the second type of content are provided, and integrating the first scene graph and the second scene graph into an integrated scene graph on the common 3D space.

10. The method of claim 9, wherein the generating of the image comprises generating an image for each viewing zone from scene information in which the first type of content is blended with the second type of content according to the integrated scene graph.

11. The method of claim 10, wherein the generating of the image comprises rendering images for n-view points from the integrated scene graph.

12. The method of claim 10, wherein the generating of the image comprises generating the 3D image by multiplexing images for each viewing zone.

13. The method of claim 12, further comprising providing the display device with the generated 3D image.

14. The method of claim 7, further comprising loading the first type of content and the second type of content through an HTTP protocol.

15. The method of claim 7, wherein the hardware characteristic indicates which one of a super multiview 3D display, a multiview 3D display, and a general display device is a type of the display device.

* * * * *